US010333897B2

(12) United States Patent
Arramreddy et al.

(10) Patent No.: US 10,333,897 B2
(45) Date of Patent: Jun. 25, 2019

(54) DISTRIBUTED FIREWALLS AND VIRTUAL NETWORK SERVICES USING NETWORK PACKETS WITH SECURITY TAGS

(71) Applicant: Attala Systems, LLC, Saratoga, CA (US)

(72) Inventors: Sujith Arramreddy, Saratoga, CA (US); Sai Gadiraju, Los Altos, CA (US)

(73) Assignee: Attala Systems Corporation, San Jose, CA (US)

( * ) Notice: Subject to any disclaimer, the term of this patent is extended or adjusted under 35 U.S.C. 154(b) by 65 days.

(21) Appl. No.: 14/921,873

(22) Filed: Oct. 23, 2015

(65) Prior Publication Data

US 2017/0118173 A1 Apr. 27, 2017

(51) Int. Cl.
*H04L 29/06* (2006.01)

(52) U.S. Cl.
CPC ...... *H04L 63/0236* (2013.01); *H04L 63/0428* (2013.01); *H04L 63/20* (2013.01)

(58) Field of Classification Search
CPC .. H04L 63/0236; H04L 63/0428; H04L 63/20
See application file for complete search history.

(56) References Cited

U.S. PATENT DOCUMENTS

| 5,606,668 A * | 2/1997 | Shwed ............... H04L 29/06 380/42 |
| 5,680,461 A * | 10/1997 | McManis ............ H04L 29/06 713/162 |
| 8,463,825 B1 * | 6/2013 | Harty ................. G06F 16/188 707/813 |
| 8,804,747 B2 | 8/2014 | Galles et al. |
| 8,959,215 B2 | 2/2015 | Koponen et al. |
| 9,380,025 B2 * | 6/2016 | Nellikar ............. H04L 63/0245 |
| 9,462,010 B1 * | 10/2016 | Stevenson .......... H04L 63/1433 |
| 9,565,189 B1 * | 2/2017 | Gill .................... H04L 63/0876 |
| 2003/0126468 A1 | 7/2003 | Markham |

(Continued)

OTHER PUBLICATIONS

Young, Lee W.; Search Report and Written Opinion; PCT App. No. PCT/US2016/058553; dated Jan. 23, 2017; 9 pages.

*Primary Examiner* — Sarah Su
(74) *Attorney, Agent, or Firm* — Alford Law Group, Inc.; Tobi C. Clinton

(57) ABSTRACT

A method, system, and apparatus are provided for a distributed firewall and virtual network services on a network. In one example, the method includes storing a plurality of predefined security groups, wherein each predefined security group has a set of predefined security rules for network packets configured to be transmitted between virtual machines (VMs) within the network; associating each virtual machine (VM) within the network with one or more predefined security groups (SGs); filtering an outgoing network packet from a sending VM to a receiving VM in response to the predefined security rules associated with the predefined SGs associated with the sending VM to validate the communication desired in the outgoing network packet; forming a secured network packet by encapsulating a header, a security tag, and the outgoing network packet together; and transmitting the secured network packet into the network for delivery to the receiving VM.

23 Claims, 13 Drawing Sheets

(56) References Cited

U.S. PATENT DOCUMENTS

| | | | |
|---|---|---|---|
| 2004/0160903 A1* | 8/2004 | Gai | H04L 12/4645 |
| | | | 370/254 |
| 2013/0060940 A1* | 3/2013 | Koponen | H04L 12/4633 |
| | | | 709/225 |
| 2014/0282524 A1* | 9/2014 | Abidi | G06F 9/45533 |
| | | | 718/1 |
| 2015/0009999 A1 | 1/2015 | Oguchi | |
| 2015/0012998 A1* | 1/2015 | Nellikar | H04L 63/0245 |
| | | | 726/13 |
| 2015/0195137 A1* | 7/2015 | Kashyap | H04L 41/0893 |
| | | | 370/254 |
| 2016/0112269 A1* | 4/2016 | Singh | H04L 41/0853 |
| | | | 709/224 |
| 2017/0005986 A1* | 1/2017 | Bansal | H04L 63/0263 |
| 2018/0048537 A1* | 2/2018 | Gaikwad | H04L 41/0893 |

* cited by examiner (Background)

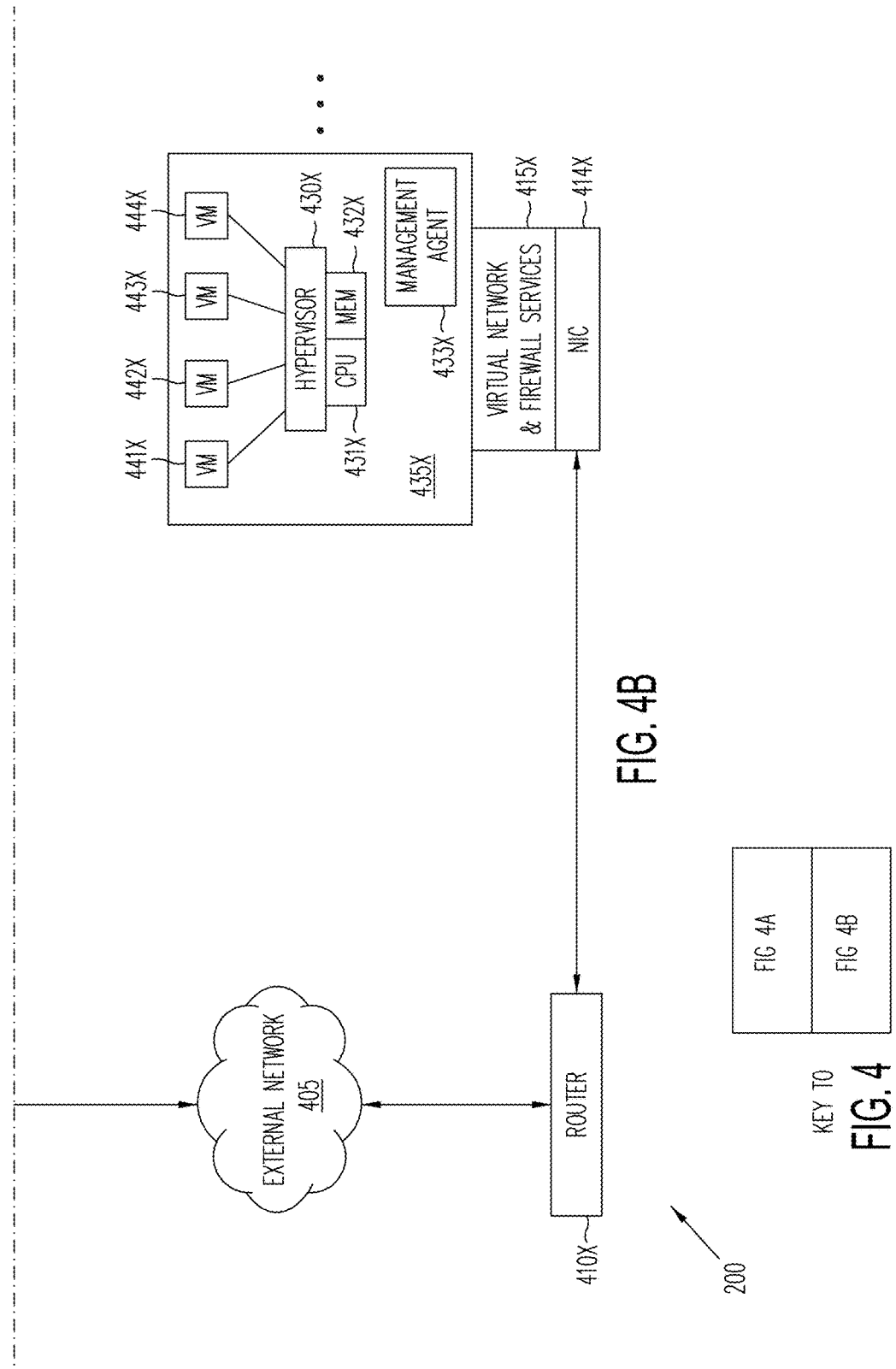

DISTRIBUTED FIREWALLS AND VIRTUAL NETWORK SERVICES USING NETWORK PACKETS WITH SECURITY TAGS

FIELD

The embodiments of the invention relate generally to firewalls.

BACKGROUND

A conventional firewall is a means by which computer communication traffic is regulated. It is designed to block unauthorized access to a computer or computer network while allowing the computer or computer network to communicate outwardly to other computers and other computer networks. A conventional firewall may be categorized as being a hardware firewall when implemented with a separate dedicated network device or as a software firewall when executed by software. The conventional firewall is often combined with a router device.

FIG. 1 (Background) is a conceptual diagram of a network 100, including a conventional firewall 110. The conventional firewall 110 is coupled between the Internet 105 and a local area network (LAN), including a server 115 and computers 102A-102N. The conventional firewall 110 is a network security device that grants or rejects network access to traffic flows between an untrusted zone (e.g., the Internet 105) and a trusted zone (e.g., a private or corporate network). In this example, the trusted zone includes server 115 and computers 102A-102N. The conventional firewall 110 acts as the demarcation point or "traffic cop" in the network 100, as all communication should flow through the firewall 110. The firewall 110 is where traffic is granted or rejected access.

Conventional firewalls enforce access controls through a positive control model, which states that only traffic defined in the firewall policy is allowed onto the network; all other traffic is denied (known as "default deny"). The conventional firewall aggressively analyzes incoming computer communication traffic. The incoming and outgoing computer communication traffic with a local network is often referred to as north-south traffic. The device-to-device or computer to computer traffic within a local computer network, commonly referred to as east-west traffic, is not analyzed by the conventional router.

Conventional firewalls do not protect local area networks from internal attacks. When seen from the view of a conventional firewall at the entry point or perimeter of a local area network, every computer and server on the internal local area network is a trusted computer. The internal computer communication traffic within a trusted local area network is not seen by the hardware firewall. Accordingly, the traditional firewall at the entry point does not filter internal computer communication traffic and thus cannot protect computers on a local area network from an internal threat.

Multiple firewalls may be used within a local area network, subdividing the firewall into smaller local area sub-networks that are protected from each other. However, such an infrastructure is overly expensive. Moreover, different policies are often applied to each of the firewalls, thereby increasing the complexity of administration and the load of filtering packets within the network.

Each computer 102A-102N in a local area network may additionally have its own software firewall that is part of the computer operating system and is executed to further deny or allow packets to enter a client computer or a computer server. However, each software firewall also requires tedious configuration as to the type of packets, or software application that is going to be used. Users often turn off the software firewall on their computers within the local area network in order for software applications to function with servers outside the network, defeating the purpose of the software firewall. Oftentimes, users are unaware of the software firewall and never turn them on to protect their client computer.

Protecting each and every computer server in a data center, including virtual servers, further complicates matters with regards to software firewalls. Certain computer servers in a data center often want to be protected and firewalled from other computer servers in the same data center and not just the internet.

Furthermore, setting up each and every software firewall for each and every computer server in a data center is rather tedious. Virtual machines or servers can readily come online within a hardware computer server, requiring setup of the software firewall before it can be used.

Additionally, software firewalls tend to become network bottlenecks. Due to the increasing speed of networks, amount of data passing through, and the complexity of protocols that firewalls must support, software firewalls are more likely to be the congestion points of networks.

BRIEF SUMMARY

The embodiments of the invention are summarized by the claims that follow below. However, briefly, a method, system, and apparatus are provided for a distributed firewall and virtual network services on a network. In one example, the method includes storing a plurality of predefined security groups, wherein each predefined security group has a set of predefined security rules for network packets configured to be transmitted between virtual machines (VMs) within the network; associating each virtual machine (VM) within the network with one or more predefined security groups (SGs); filtering an outgoing network packet from a sending VM to a receiving VM in response to the predefined security rules associated with the predefined SGs associated with the sending VM to validate the communication desired in the outgoing network packet; forming a secured network packet by encapsulating a header, a security tag, and the outgoing network packet together; and transmitting the secured packet into the network for delivery to the receiving VM.

BRIEF DESCRIPTIONS OF THE DRAWINGS

FIG. 4B is a block diagram of an external network that is coupled to the internal network of FIG. 4A.

DETAILED DESCRIPTION

In the following detailed description of the embodiments of the invention, numerous specific details are set forth in order to provide a thorough understanding of the present invention. However, it will be understood by one skilled in the art that the embodiments of the invention may be practiced without these specific details. In other instances well-known methods, procedures, components, and circuits have not been described in detail so as not to obscure aspects of the embodiments of the invention unnecessarily.

The embodiments of the invention include a method, apparatus, and system for distributed firewalls and virtual network services.

Distributed Firewalls

The method operates in distributed firewalls in a virtualized server environment. An overview of firewalls, access control rules and virtualization are presented in the following sections before presenting the method of the present technology.

Figure 1:
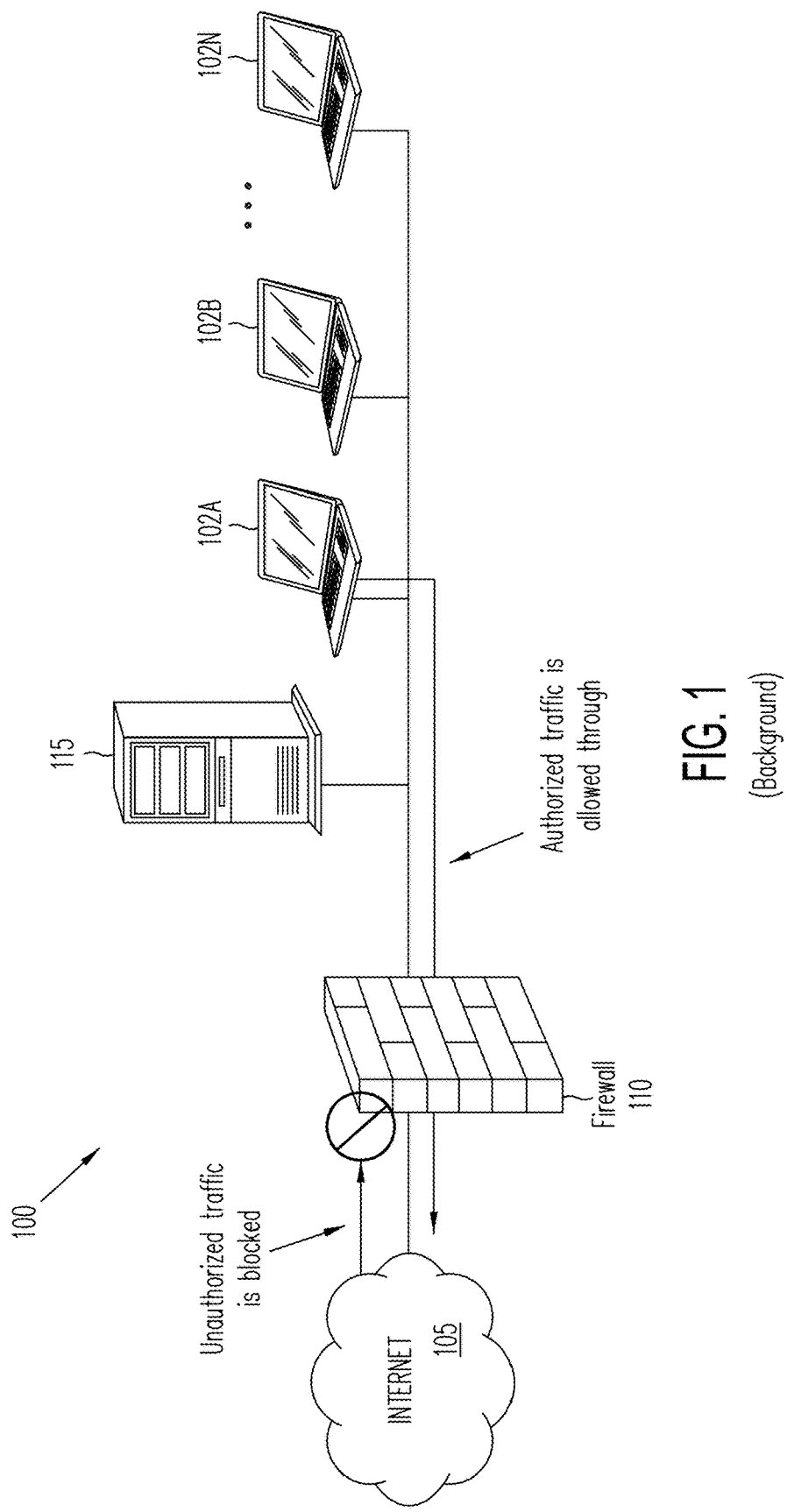
FIG. 1 is a background figure of a local area network with a conventional firewall.
Figure 2:
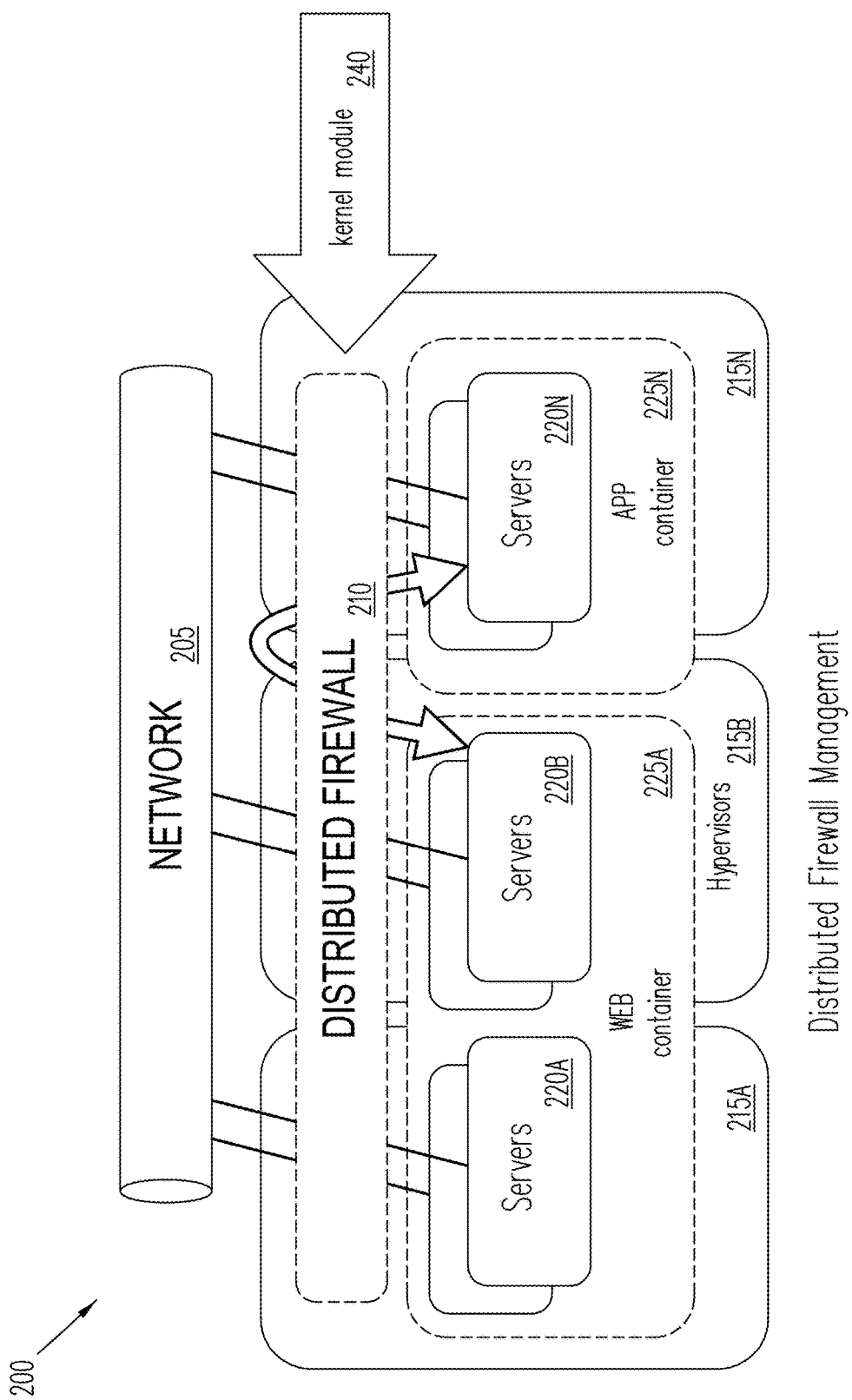
FIG. 2 is a conceptual diagram of a network that includes distributed firewall management.

FIG. 2 is a conceptual diagram of a computer network 200 that includes a distributed firewall 210. A network 205 couples to a plurality of servers 220A-220N. A web container 225 includes the servers 220A-220B. An application container includes server 220N. FIG. 2 shows the distributed firewall 210 resident in a virtualization layer, including hypervisors 215A-215N running on a physical layer.

The distributed firewall 210 is embedded as a service in the programmable hypervisor kernel networking stack 240. All participating hypervisors 215A-215N are collectively one firewall, the distributed firewall 210. Every virtual server 220A-220N is connected to one of hypervisors 225A-225N. By consequence, in this model, every virtual server 220A-220N is directly connected to one distributed firewall 210, which knows substantially everything about virtual servers 220A-220N.

Network Security Groups

As it was noted earlier, the conventional firewalls were hanging off the network filtering packets but not directly connected to the servers. Consequently, security policy was only as good as the information available in the packets; such as Internet Protocol (IP) addresses and Transmission Control Protocol/User Datagram Protocol (TCP/UDP) port numbers. So, the firewall security rules (e.g., access control lists or ACLs) are designed around that basic context (e.g., "This IP address can talk to that IP address on TCP port X", and so on). As corporations and data centers grew, the networks have been tiered into sub networks (subnets) with firewalls at the perimeter of these subnets. Despite the use of Subnets, the ACLs have grown in size and complexity due to the sheer number of Servers in each subnet within a data center.

Accordingly, network security groups (NSGs) have been introduced with a goal of reducing the size and complexity of ACLs and making rules management easier. A NSG is a type of security group that includes, without limitation, an identifier and a set of rules defined by a network administrator. NSGs are associated with virtual machines (VMs), subnets, and/or a group of VMs based on the role of the VMs. Firewalls that are distributed across the VMs (e.g., distributed firewalls) include security rules of NSGs for filtering network traffic at the VMs. Accordingly, the security rules are defined at NSGs instead of at individual VMs. Any changes to the security rules are made to the NSGs which are then propagated to all associated VMs. A typical NSG rule may include, without limitation, the following parameters: rule priority, source VM, destination VM, source port, destination port, protocol, and allow/deny flag.

Figure 3:
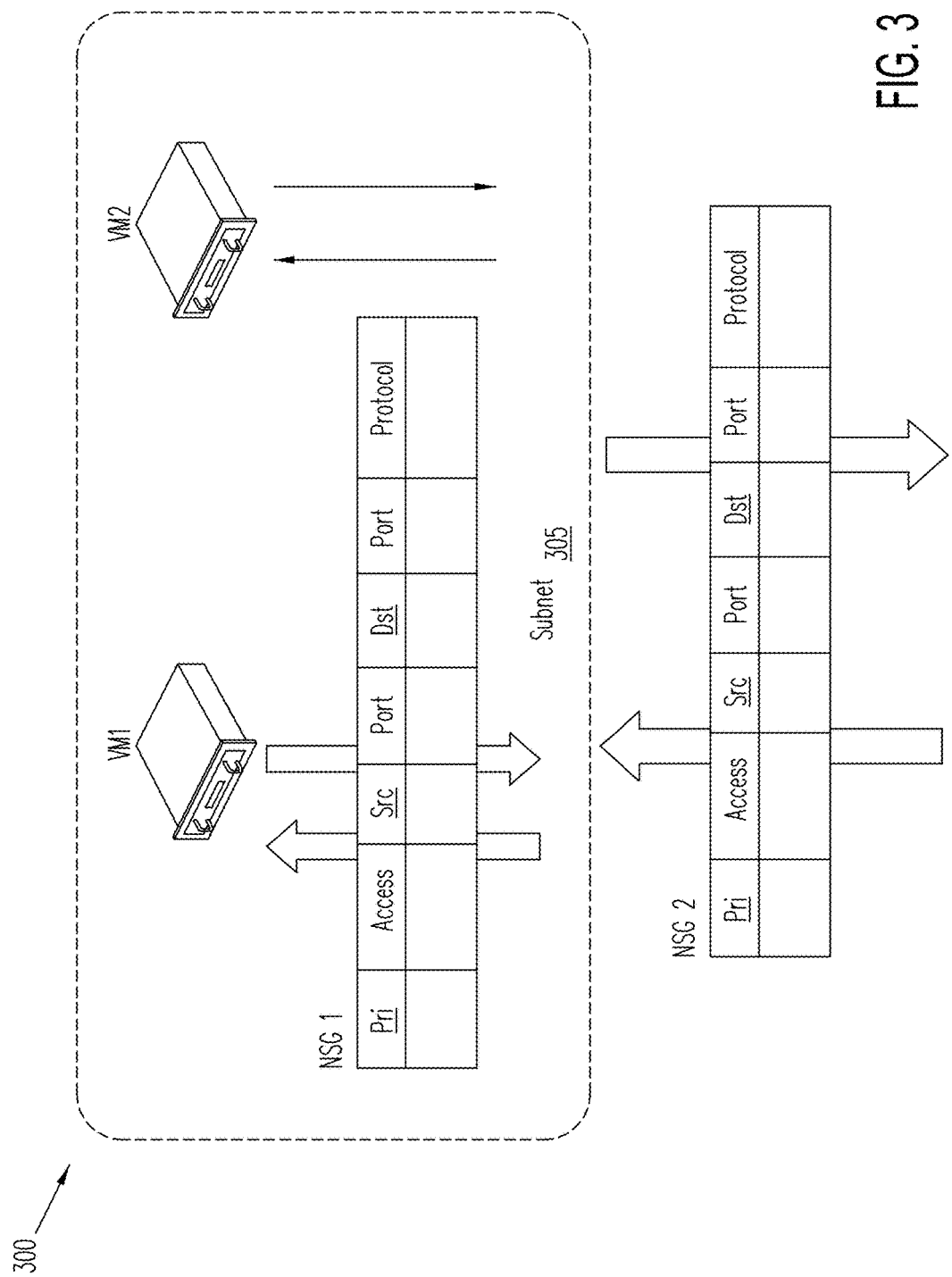
FIG. 3 is a conceptual diagram of an example a network system that includes subnets.

FIG. 3 is a conceptual diagram of an example a network system 300 that includes subnets. In this example, Network Security Groups include NSG1 and NSG2. A subnet 305 includes a virtual machine VM1 and a virtual machine VM2. The system 300 applies the Network Security Groups at a subnet level and at a VM level. For example, the system 300 applies NSG 1 at the VM level to VM1, but not to VM2. The system applies NSG2 at the subnet level to both VM1 and VM2.

Although the NSG concept has helped in reducing the maintenance overhead of conventional ACLs, the NSG concept has not helped in reducing the number of rules to be executed. For example, the NSGs act as a macro function to group a set of rules so that the rules can be changed in the NSGs instead of in multiple ACLs, thereby reducing the Management overhead. However, the number of rules to be executed to determine the access has (until the proposed method below) remained the same and been an unresolved issue.

The sections above have shown the following major trends:
Firewalls started at the perimeter of a corporate network, moved to the perimeter of smaller subnets within the corporate network, and then transitioned to distributed firewalls which run in the hypervisors of physical servers.
Servers have been transitioning into VMs with the advent of virtualization.
Access rules have been moving from ACLs to NSGs and still require a significant amount processing for each VM.

Solution: Simplifying Security Rules

The system and method disclosed herein simplifies the definition, management, and enforcement of security rules. The system can enforce (e.g., execute) security rules in software in each hypervisor, in hardware in a network interface controller (NIC) attached to a physical server, or in another device attached to the physical server. A device includes hardware, software, or a combination thereof.

Figure 4A:
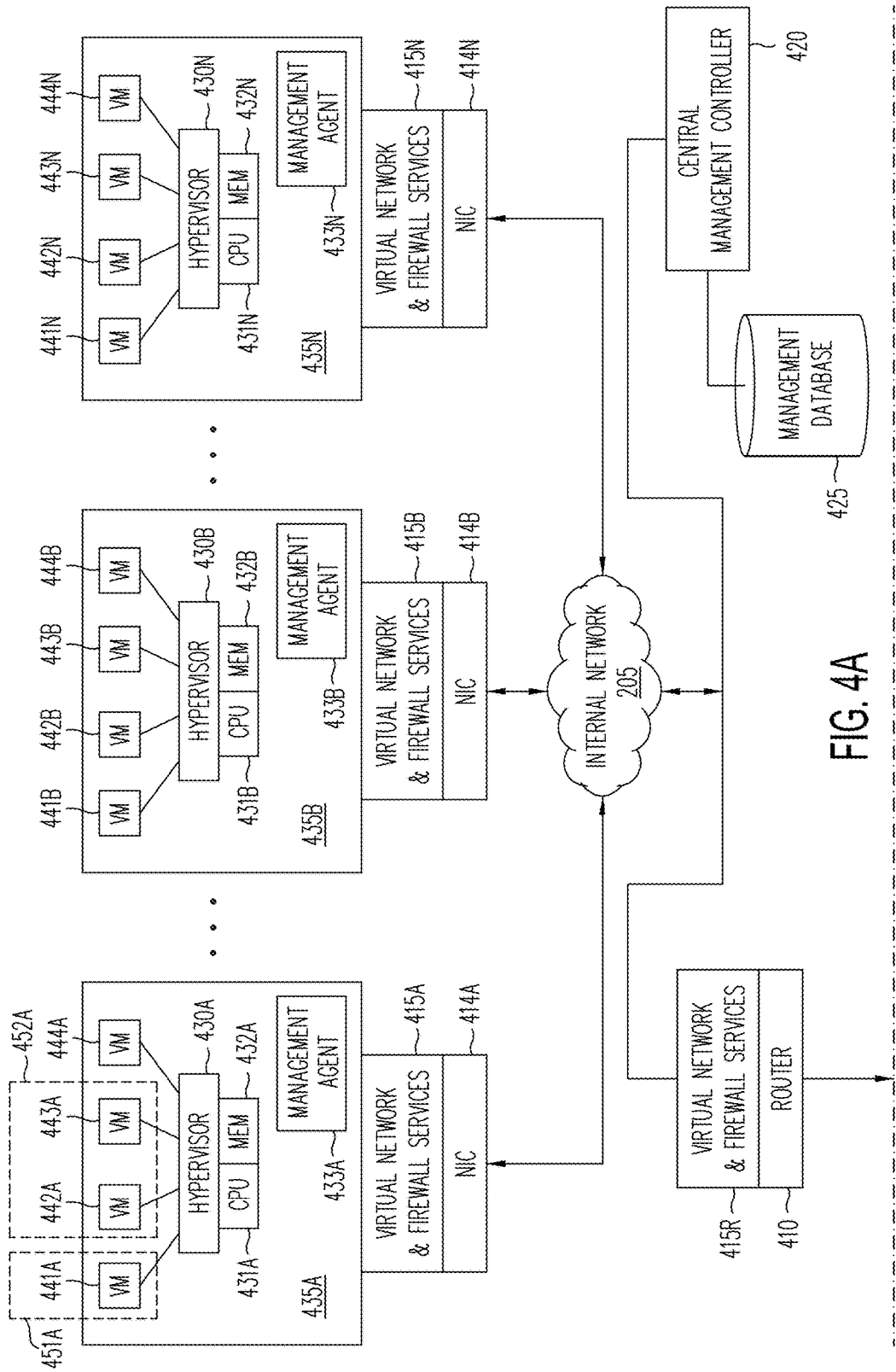
FIG. 4A is a block diagram of an internal network having central management of security rules.

FIG. 4 is a block diagram of network 200 of FIG. 2 having central management of security rules. FIG. 4 includes FIG. 4A and FIG. 4B.

FIG. 4A is a block diagram of internal network 205 (e.g., local area network, data center, etc.) and an external network 405 (e.g., wide area network, Internet, Web, etc.).The internal network 205 includes, without limitation, a central management controller 420 coupled to servers 435A-435N and a router 410 (e.g., gateway router). The external network 405 includes, without limitation, a router 410X coupled to a server 435X.

Server 435A includes a processor 431A and a memory device 432A. The server 435 includes a hypervisor 430A, which is a software module that resides on the memory device 432A. The hypervisor 430A manages, without limitation, virtual machines (VMs) 441A-444A, and so on. A management agent 433A is a software module that resides on the memory device 432A and enforces security rules for the server 435A. Alternatively, the management agent 433A may run on a NIC 414A that is coupled to the server 435A. NIC 414A is a computer hardware component that couples the server 435A to the internal network 205. NIC 414A may include or may be coupled to a field-programmable gate array (FPGA) that is configured to carry out virtual network and firewall services 415A. The FPGA is located between a physical network and the NIC 414A.

When a VM is created on Server 435A, the central management controller 420 associates the VM with one more security groups. Each VM 441A-444A is subjected to security rules and/or network services that pertain to each security group.

Servers 435B-435N each includes devices that are similar to the devices of server 435A. For simplicity, servers 435B-435N are not described here. Rather, reference may be made to the description of server 435A.

Router 410 operates as a gateway between the internal network 205 and the external network 405. Accordingly, the router 410 is configured to carry out virtual network and firewall services 415R, which are substantially the same virtual network and firewall services that are on the servers 435A-435N.

In the implementation of FIG. 4A, the internal network 205 is shown as a data center that provides services for tenants, such as tenant 451A and tenant 452A. A tenant is an entity (e.g., corporation, organization, or individual) that is using resources (e.g., one or more VMs) of the data center. For example, tenant 451A is leasing VM 441A. Tenant 452A is leasing VMs 442A and 443A. Tenants 451A and 452A are provided for explanatory purposes. One or more tenants may be leasing the other VMs as well. Accordingly, the resources of the data center are shared among tenant 451A, tenant 452A, and any other tenants leasing VMs in the data center. When a tenant leases a VM, the data center assigns a logical unit of a drive to the tenant. A tenant typically does not know information about the physical server on which the VM leased by the tenant is running.

FIG. 4B is a block diagram of an external network 405 (e.g., wide area network, Internet, Web, etc.), which is coupled to internal network 205 of FIG. 4A. External server 435X includes a processor 431X and a memory device 432X. The server 435 includes a hypervisor 430X, which is a software module that resides on the memory device 432X. The hypervisor 430X manages, without limitation, virtual machines (VMs) 441X, 442X, 443X, 444X, and so on. A management agent 433X is a software module that resides on the memory device 432X and enforces security rules for the server 435X. Alternatively, the management agent 433X may run on a NIC 414X that is coupled to the server 435X. The NIC 414X is a computer hardware component that couples the server 435X to the external network 405. NIC 414X may include a field-programmable gate array (FPGA) that is configured to carry out virtual network and firewall services 415X.

Referring to FIG. 4A, the central management controller 420 is coupled to a management database 425, which is located in a data center of a storage area network of the internal network 205. The management database 425 centrally stores the location and configuration information of all the VMs, virtual network and firewall services that may be distributed and enforced at servers 435A-435N, router 410, external router 410X, and external server 435X. At each server or router, the virtual network and firewall services are enforced via hardware (e.g., NIC), software (e.g., management agent), or a combination of hardware and software.

As further described below, there are three main components in the present solution: defining a distributed firewall and virtual network services policy (e.g., defining security rules and network services rules), distributing the virtual network service policy (e.g., maintaining the security and network services policies on the distributed firewall), and enforcing the virtual network service policy (e.g., processing or executing security and network service policies).

Defining a Distributed Firewall and Virtual Network Services Policy

In prior schemes, both ACLs and Security Groups defined the rules for incoming packets in terms of the Internet Protocol (IP) address or a range of IP addresses of the source VMs. Unfortunately, such a scheme has not only led to the explosion in size of the security rules list, but such a scheme has also generated non-uniformity in the security rules. An IP address meant for routing was being used to represent a security policy. It was extremely difficult to simplify the security policies when the IP addresses were meant for routing and were being generated by entities that did not deal with security.

Accordingly, the proposed distributed firewall and virtual network services (DF and VNS) policy includes the following: security domains, security group memberships, security rules (a.o.t., IP addresses for each VM) to determine whether a packet can be allowed or denied, and network services rules to determine what type of network services are to be provided for each of the IP Packets.

Referring again to FIG. 4, the central management controller 420 defines each security domain, which is a high-level identifier associated with a data center tenant in a multi-tenant shared data center. For example, tenant 451A is associated with one security domain, while tenant 452A is associated with another security domain. In one implementation, the security domain identifier (e.g., security tag) is the most unique identifier for a data center tenant that is using the resources in the data center. The security domain identifier is an integral part of all packets that are transferred between the VMs of a given data center tenant. The security domain identifier helps provide isolation from traffic of other data center tenants within the data center. The system can use the security domain identifier to associate the tenant with the security rules and/or network services that the tenant is using. The security domain for a tenant can be sliced into multiple security groups by associating the tenant's security domain identifier with multiple security groups.

A security group is analogous to security segments. The idea is that in data centers, there is always a set of VMs sharing workloads and the access rights of the VMs sharing workloads can be defined at a group level instead of individual VMs. For example, the system can categorize VMs into security groups based on roles and network administration policies. Distinct memberships can be assigned to distinct roles such as Internet, application and database services. The memberships are assigned based on network administration policies, such as applications, compliance, and so on.

A security rule establishes the virtual machines that are associated with one or more security groups at the time of creation. The security rules and network services rules are defined in terms of security groups rather than the VMs. The central management controller 420 and/or each management agent can add or delete a security rule anytime thereafter. Each management agent (e.g., management agent 433A) associates each of the VMs at the server (e.g., server 435A) with a set of rules that define the access policies for that VM.

An example format for security rules is shown in Table 1 below:

TABLE 1

Example Format for Security Rules

Security Domain ID
Security Group Membership Vector
Protocol: The protocol to allow (e.g., TCP, UDP, or ICMP)
Destination Port:
    TCP and UDP, or a custom protocol: Port Number or a range of ports to allow and a mask to specify a range of ports
    ICMP: The ICMP type and code
Permission: Access or Deny.

In the example of Table 1 above, the rule states that if the source VM belongs to the security group stated and is trying to access the destination port (or a range of ports) with the protocol included, then access can be given based on the permission field. Each of the VMs running on the node (e.g., physical server) has a set of these rules that are processed to determine the access. These rules apply for both incoming and outgoing packets.

An example format for network services rules is shown in Table 2 below:

TABLE 2

Example Format for Network Services Rules

Security Domain ID
Security Group Membership Vector
Protocol: The protocol to allow (e.g., TCP, UDP, or ICMP)
Destination Port:
    TCP and UDP, or a custom protocol: Port Number or a range of ports to allow and a mask to specify a range of ports
    ICMP: The ICMP type and code
Type of Network Service to be provided In Table 2 above (similar to Table 1), the rule states that if a source VM belongs to the security group stated and is trying to access the destination port (or a range of ports) with the protocol included, then provide the network services that are defined in the rule. Example network services include packet capture, deep packet inspection, gathering statistics (e.g., throughput, round-trip time (RTT), number of packets sent, etc.), performing mirroring functionality by sending packet to two different networks, and so on.

Distributing the Virtual Network Services Policy

As stated above, the source in the rules for the incoming packets is identified by a security group and not by an IP address or a group of IP addresses. Such a scheme provides a clear isolation for the security policy from routing information.

Every security domain has a set of security groups to allow enough granularity to segment the security policies. It is a requirement to have enough memberships for the network administrator to be able to group the VMs at a very fine granularity in terms of its access/security privileges. Every VM in the security domain is associated with one or more of these security groups based on the role of the VM and the security policies as defined by the Network Administrators.

The system can add/modify/delete the rules for the security groups at any time. The system can add/delete memberships for the VMs at any time. The system can add/delete VMs for a security domain at any time. When a server adds/modifies/deletes a VM, the security rules of the other servers do not get impacted as the rules are specified in terms of security groups and not individual VMs. In a case where rules are added/deleted to the security groups, the central management controller 420 broadcasts the changes to the management agents at the servers that have VMs subscribed to the respective security groups.

In contrast, a traditional system organized rules and services based on the IP address of each VM. Even network security groups were organized according to the IP address of each VM. The management controller was extremely complicated and kept a separate list for each VM. The combined list was extremely long. For example, if a VM was receiving IP packets from 20 other VMs, then those 20 other VMs had to be listed in an access table. Traditional methods moved toward grouping VMs of the same type and then group firewalls based on application type. Such complex unfortunately caused a bottleneck at the firewalls.

Enforcing the Virtual Network Services Policy

Figure 5:
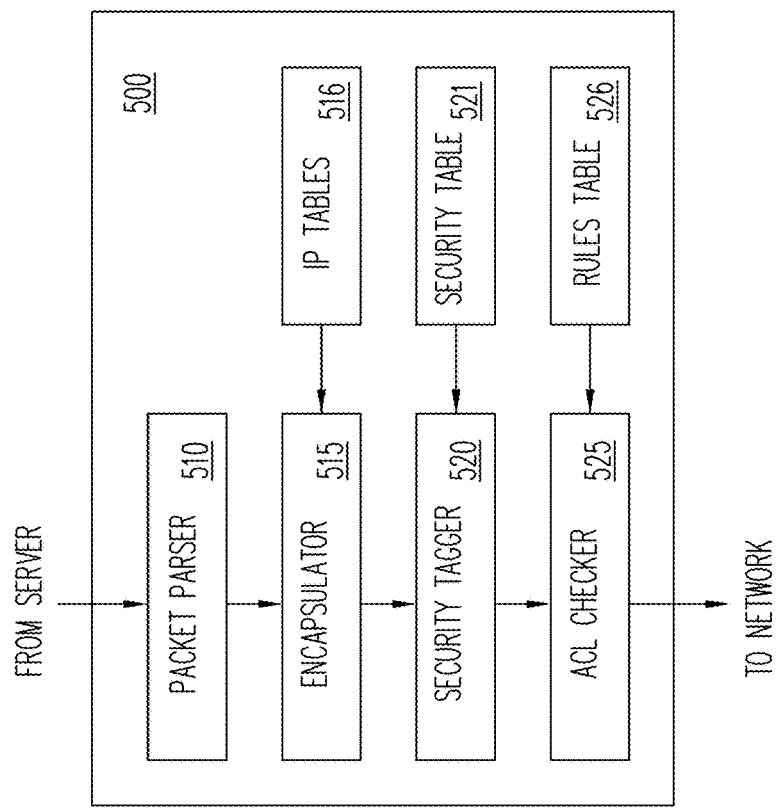
FIG. 5 is a block diagram of an enforcement component (EC) for processing outgoing network packets.

FIG. 5 is a block diagram of an enforcement component (EC) 500 for processing outgoing network packets. The EC 500 runs at the head end of a node (e.g., physical server 435A) in a dedicated hardware component or integrated into the NIC device (e.g., NIC 414A) attached to the server. The EC 500 may also include a software module that resides in a memory (e.g., memory device 432A) of the physical server and is executed by a processor of the physical server. The local management agent communicates with the central management controller and fills IP tables 516, security tables 521, and security rules tables 526. These tables are physically in memory of the NIC (e.g., FPGA). The services and/or rules are implemented by the hypervisor and/or FPGA.

A packet parser device 510 parses an outgoing network packet. For example, the packet parser device 510 identifies each field of the outgoing network packet for further analysis.

An encapsulator device 515 encapsulates the outgoing network packet with a security tag, among other data. The encapsulator device 515 uses IP tables 516, which are updated by the management agent. IP tables 516 include IP info for each VM running in the internal network.

A security tagger device 520 tags the outgoing network packets with the security domain tag and the security group subscription information of the source VM. The security tagger device 520 uses a security table 521, which includes the security domain and security groups information of all the VMs that are running on that physical server. There are several ways to tag this information. One of the ways is by using the Generic Network Virtualization Encapsulation protocol (GENEVE). For example, the encapsulator device 515 may encapsulate the outgoing network packet with a GENEVE packet. The security domain identifier and security group(s) subscription of the source VM is included in the data field of the GENEVE Packet. Such encapsulation is further discussed below with reference to FIGS. 10-12.

An access control list (ACL) checker 525 checks that the encapsulated packet comports with security rules. ACL checker 525 uses rules tables 526, which include a list of security rules for each of the VMs running on that physical server. ACL checker also uses a network services rules table to determine if there are any network services that have to be performed on this packet. The physical server then sends the network packet out to the network. For example, an encapsulated GENEVE packet is processed at the destination physical server by the EC running on the destination physical server.

Figure 6:
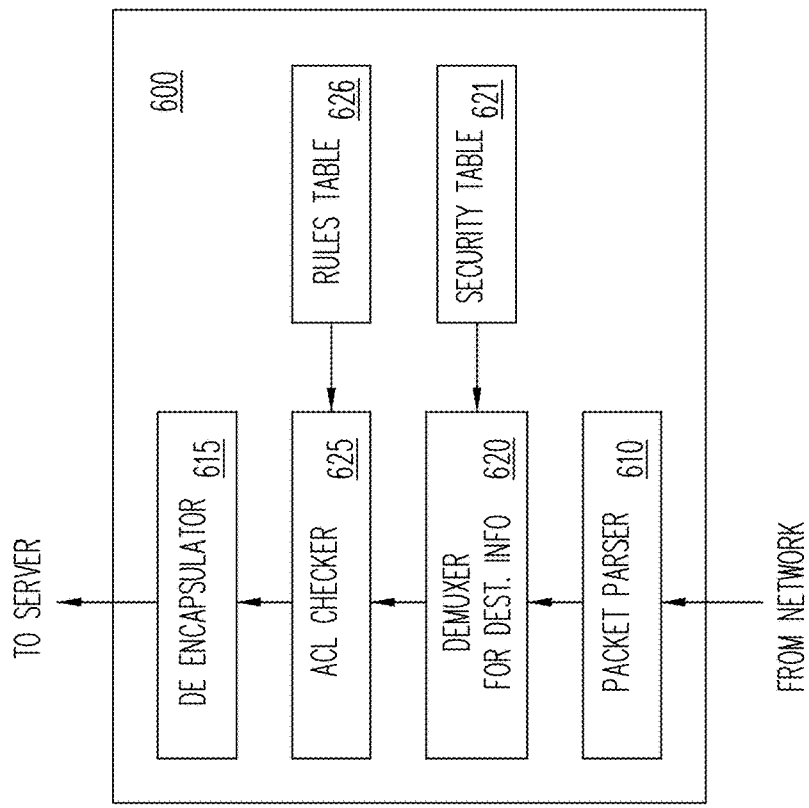
FIG. 6 is a block diagram of an enforcement component (EC) for processing incoming network packets.

FIG. 6 is a block diagram of an enforcement component (EC) 600 for processing incoming network packets. The EC 600 runs at the head end of a node (e.g., physical server 435A) in a dedicated hardware component or integrated into the NIC device (e.g., NIC 414A) attached to the server. The EC 600 may also include a software module that resides in a memory (e.g., memory device 432A) of the physical server and is executed by a processor of the physical server.

EC 600 resides on the same integrated circuit (IC) chip as EC 500 of FIG. 5. Accordingly, the IC chip for EC 500 and EC 600 is bi-directional to handle outgoing packets (from server to network) and incoming packets (from network to server).

A packet parser device 610 parses an incoming network packet. For example, the packet parser device 610 identifies each field of the incoming network packet for further analysis. EC 600 parses the incoming network packets to determine if the packets are GENEVE Packets. In a case of GENEVE packets, EC 600 strips off the GENEVE header and data. EC then extracts the security domain tag and security group(s) subscription information of the source VM.

A de-multiplexer device 620 separates a single line of input into several output signals (e.g., several fields of the network packet). The de-multiplexer device 620 uses security tables 621, which includes the security domain and security groups information of all the VMs that are running on that physical server. In a case of a GENEVE packet, EC 600 identifies the destination VM from the destination address in the network packet that is encapsulated in the GENEVE packet.

An ACL checker device 625 checks that the encapsulated network packet comports with security rules. ACL checker 625 uses rules tables 626, which include a list of security rules for each of the VMs running on that physical server. EC 600 checks the security domain identifier of the source VM against the security domain identifier of the destination VM. If there is a match, then EC 600 uses the security group(s) subscription information of the source VM to process the rules (stored in EC 600) of the destination VM to determine the access. EC 600 allows the network packet to be sent to the destination VM if the rules allow access. EC 600 calls for the packet to be dropped if the rules deny access. The ACL checker also checks the network services rules associated with the destination VM to determine the network services that need to be performed on this packet. On the other hand, EC 600 forwards a non-GENEVE packet to the destination VMs without parsing further.

A decapsulator device 615 decapsulates the incoming network packet by removing the security tag, among other data, from the network packet. A VM of the physical server may then perform further processing on the decapsulated network packet.

Referring again to FIG. 4, for network packets that have a destination server in the external network 405, the gateway router 410 decapsulates the network packet and pass the decapsulated network packet out of the internal network 205 to the external router 410X. If the external router 410X is configured with the virtual network and firewall services 415R, then the external router 410X can encapsulate the network packet and pass the network packet into the external network 405, including server 435X. An enforcement controller at the external server 435X can decapsulate the network packet, and then pass the network packet to the external server 435X for further processing.

Method Overview

Figure 7:
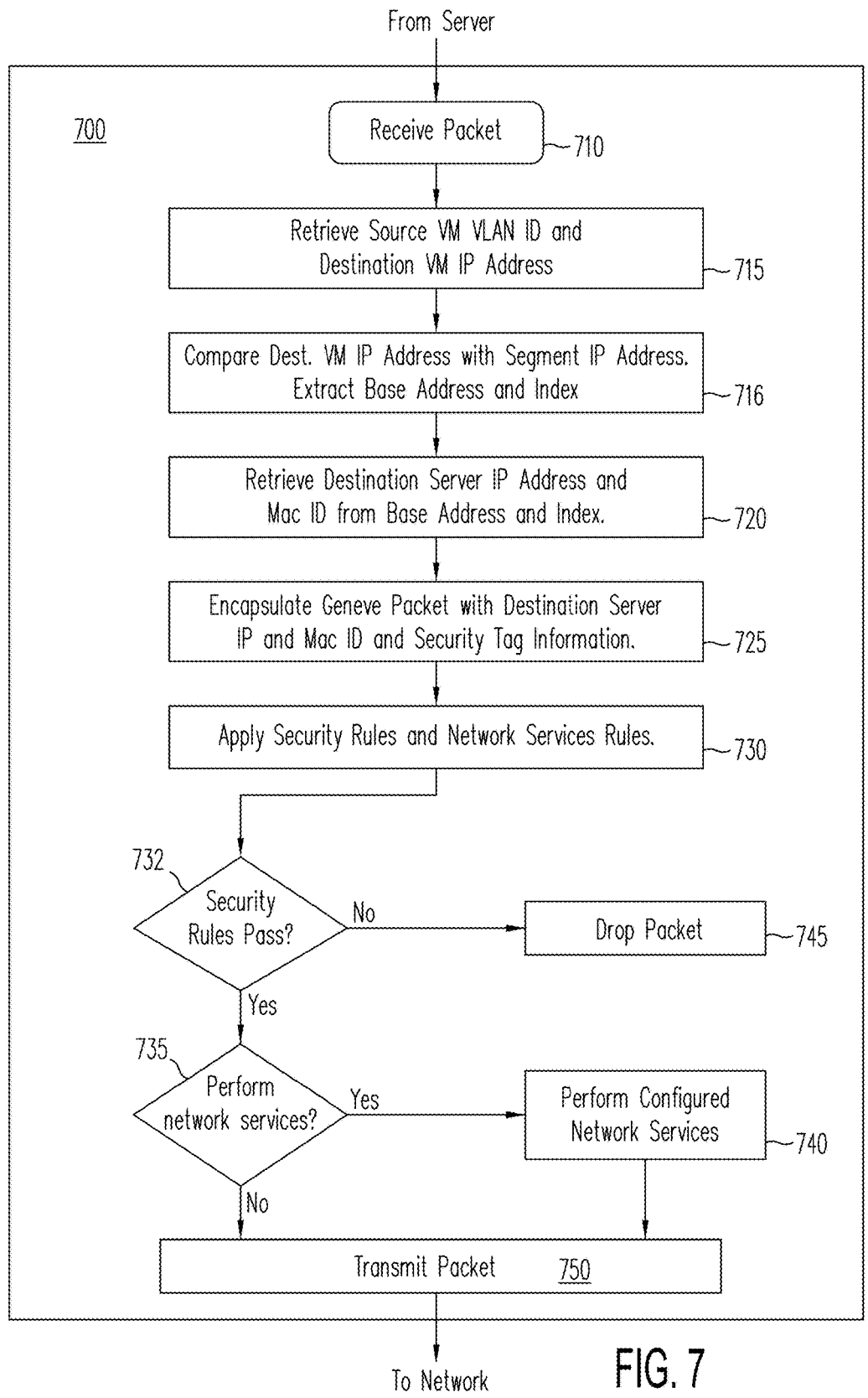
FIG. 7 is a flowchart for an example method for enforcing security rules on outgoing packets at a physical server.

FIG. 7 is a flowchart for an example method 700 for enforcing security rules on outgoing network packets at a physical server. In one embodiment, the method 700 may be carried out by hardware (e.g., enforcement controller (EC) 500), software (e.g., modules running on physical server 435A), or a combination of hardware and software.

At process block 710, the EC receives a network packet. At process block 715, the EC parses the network packet. For example, the EC retrieves the source VM virtual LAN (VLAN) identifier and destination VM IP address.

At process block 716, the EC compares the destination VM IP address with the segment IP address and extracts the base address and index. At process block 720, the EC retrieves the destination server information. For example, the EC retrieves the destination server IP address and MAC ID from the base address and index.

At process block 725, the EC encapsulates the network packet with security tags. For example, the EC encapsulates a GENEVE packet with the destination server IP address and MAC ID and also encapsulates security tag information.

At process block 730, the EC applies security rules and network services rules to the secured network packet. At decision operation 732, the EC determines if the security rues pass. If the security rules do not pass, then the method 700 moves to process block 745 where the EC drops (e.g., does not transmit) the network packet.

However, if the security rules do pass at decision operation 732, then the EC moves to decision operation 735 where the EC determines if network services are to be performed on the network packet. If network services are to be performed, then the method 700 moves to process block 740 where the EC performs the configured network services. The method 700 then moves to process block 750 where the EC enables the server to transmit the secured network packet.

However, at decision operation 735, if the EC determines network services are not to be performed, then the method 700 moves to process block 750 where the EC enables the server to transmit the secured network packet.

Figure 8:
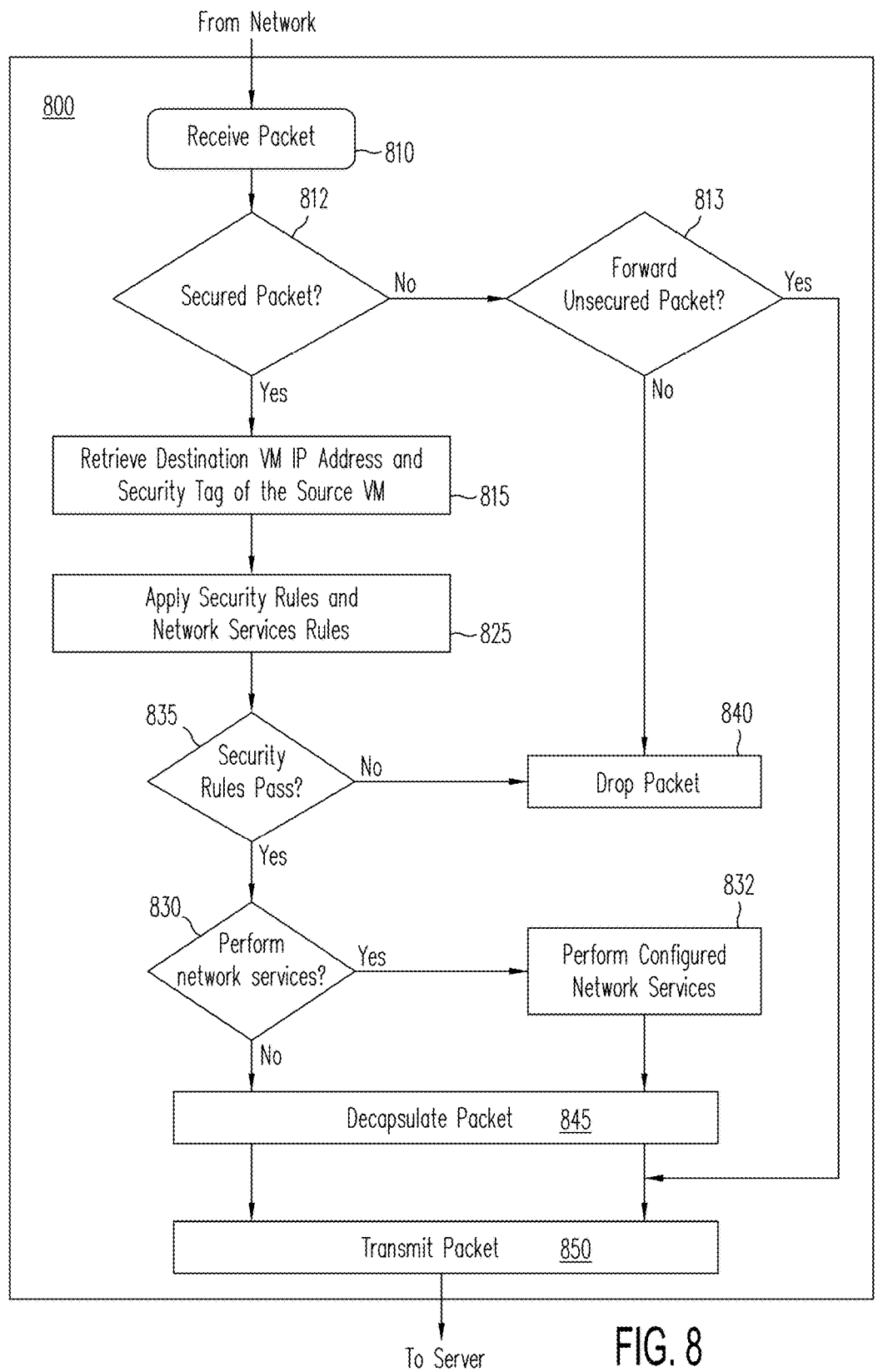
FIG. 8 is a flowchart for an example method for enforcing security rules on incoming packets at a physical server.

FIG. 8 is a flowchart for an example method 800 for enforcing security rules on incoming network packets at a physical server. In one embodiment, the method 800 may be carried out by hardware (e.g., enforcement controller (EC) 600), software (e.g., modules running on physical server 435A), or a combination of hardware and software.

At process block 810, the EC receives a network packet. At decision operation 812, the EC determines if the network packet is a secured network packet. If the packet is an unsecured network packet, then the method 800 moves to decision operation 813 where the EC determines if the unsecured network packet is to be forwarded to the server. If the unsecured network packet is not to be forwarded, then the method 800 moves to process block 840 where the EC drops (e.g., does not forward) the unsecured network packet. However, if the unsecured network packet is to be forwarded, then the method 800 moves to process block 850 where the EC transmits (e.g., forwards) the unsecured network packet to the server.

However, at decision operation 812, if the packet is a secured network packet, then the method 800 moves to process block 815 where the EC parses the secured network packet. For example, the EC retrieves the destination VM IP address and security tag of the source VM.

At process block 825, the EC applies security rules and network services to the secured network packet. At decision operation 835, the EC determines if the security rules are passed. If the security rules are not passed, then the method moves to process block 840 where the system drops (e.g., does not forward) the secured network packet.

However, at decision operation 835, if the security rules are passed, then the method 800 moves to decision operation 830 where the EC determines if network services are to be performed on the secured network packet. If network services are to be performed, then the method 800 moves to process block 832 where the EC performs configured network services. The method 800 then proceeds to process block 845 where the system decapsulates the secured (encapsulated) network packet.

However, at decision operation 830, if network services are not to be performed, then the method 800 moves to process block 845 where the system decapsulates the secured (encapsulated) network packet. At process block 850, the EC transmits (e.g., forwards) the decapsulated network packet to the server. For example the EC enables the VM running on the physical server to receive the transmission of the decapsulated network packet.

Other actions, processes, and/or details are discussed with reference to other the figures and may be a part of methods 700 and 800, depending on the implementation. For example, methods 700 and 800 enable the implementation of virtual distributed firewall 210 described with reference to FIG. 2 and further described below.

Figure 9:
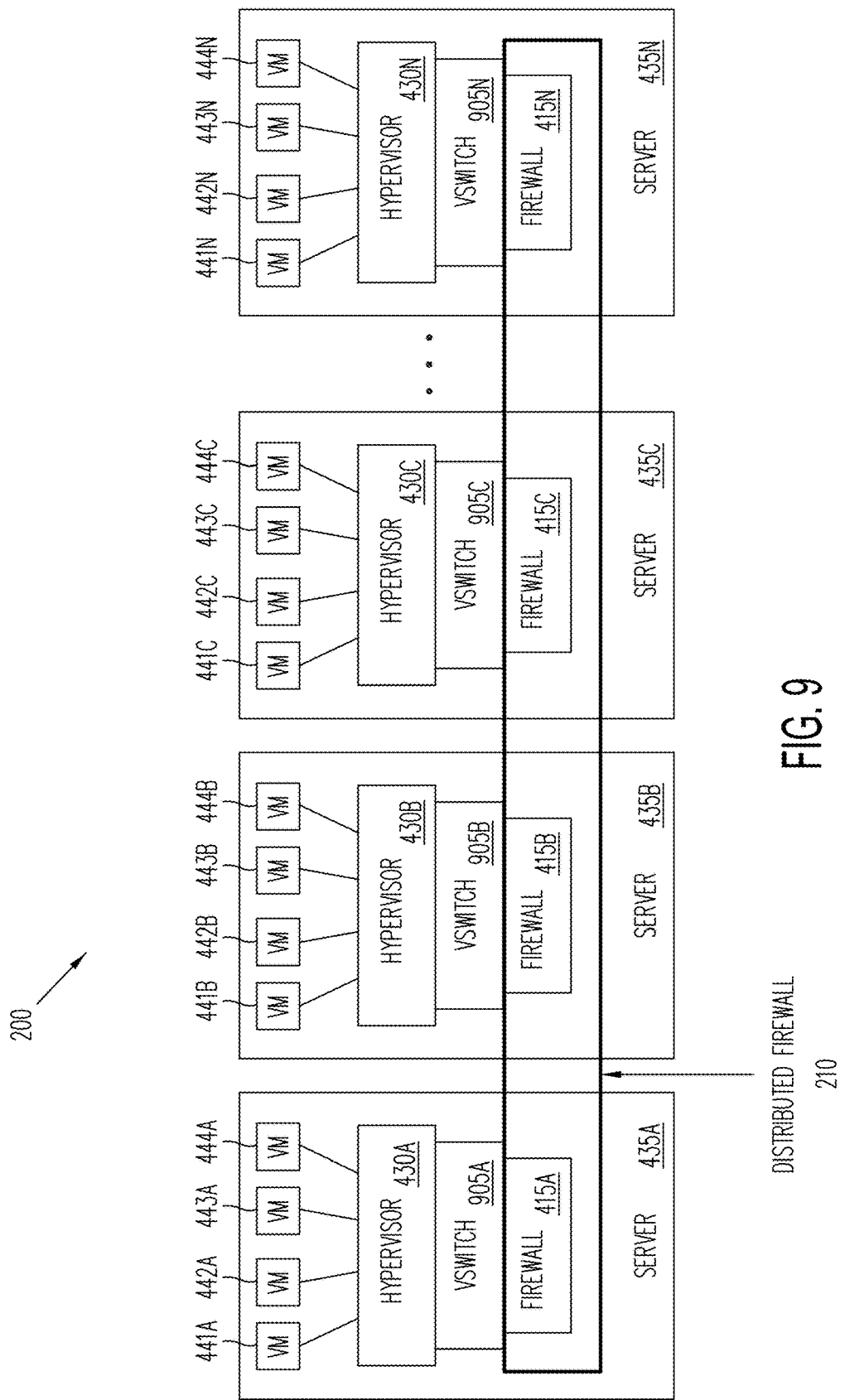
FIG. 9 is another conceptual diagram of the network having the distributed firewall of FIG. 2.

FIG. 9 is another conceptual diagram of the network 200 having the distributed firewall 210 of FIG. 2. Some devices of servers 435A-435N are described with reference to FIG. 4. For simplicity, the descriptions of these devices are not repeated here.

The distributed firewall 210 is a virtual firewall that includes firewalls 415A-415N at servers 435A-435N, respectively. Virtual switches 905A-905N are coupled between hypervisors 430A-430N and firewalls 415A-415N, respectively. Each virtual switch includes a software module that enables one VM to communicate with another VM. The central management controller 420 distributes virtual network and firewall services to management agents on the network devices (e.g., servers and routers). Accordingly, the central management controller 420 manages the distributed firewall 210.

Encapsulating a Network Packet

Figure 10:
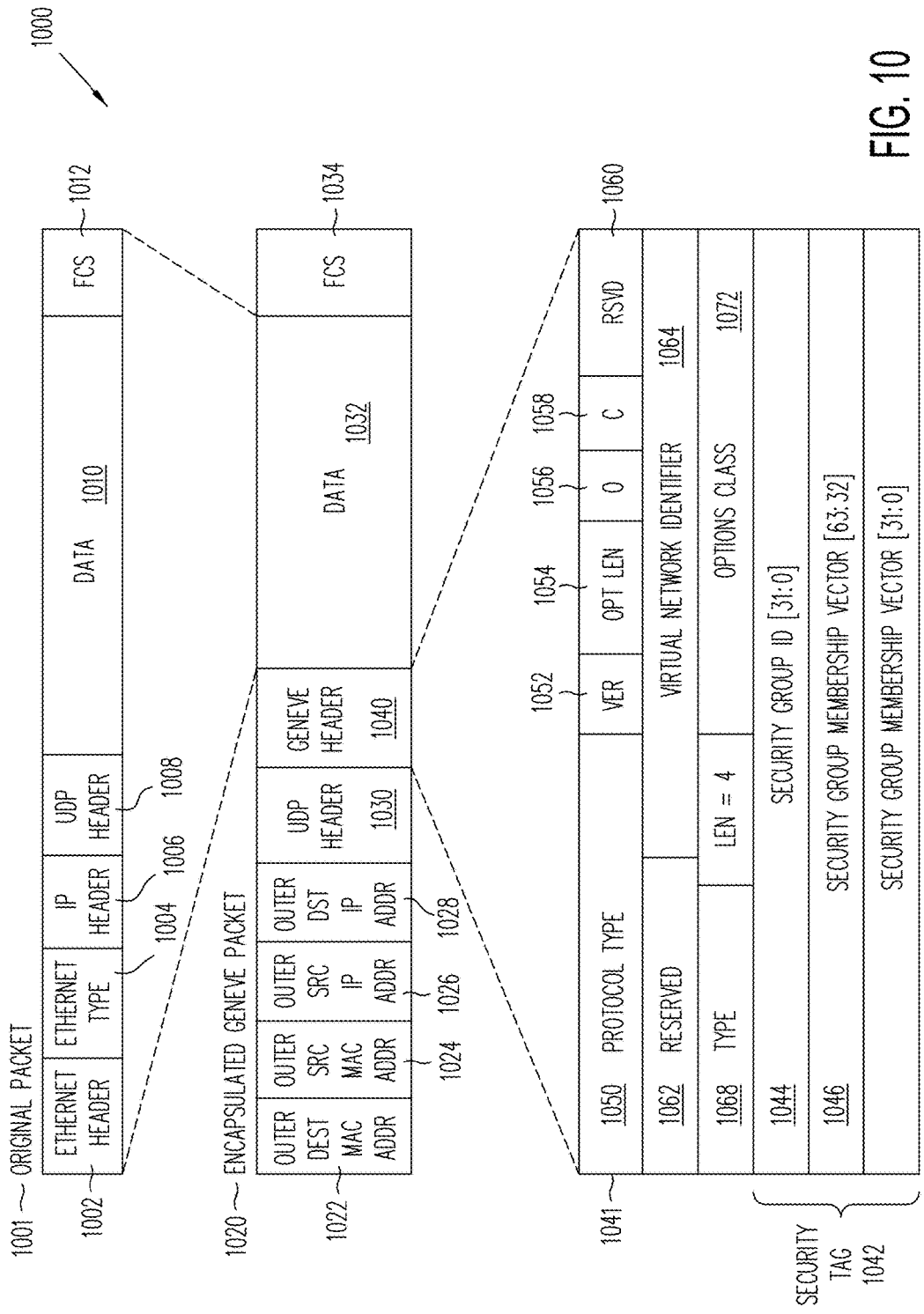
FIG. 10 is a conceptual diagram of an example encapsulation of a network packet by using the GENEVE protocol.

FIG. 10 is a conceptual diagram of an example encapsulation 1000 of a network packet by using the GENEVE protocol. The encapsulating may be carried out by enforcement component (EC) 500 of FIG. 5.

EC 500 encapsulates GENEVE packet 1020 with an original packet 1001 into a data field 1032. EC 500 encapsulates GENEVE packet 1020 with security information 1041 into a GENEVE header 1040.

In the example of FIG. 10, encapsulated GENEVE packet 1020 includes an outer destination media access control (MAC) address 1022, an outer source MAC address 1024, an outer source MAC address 1024, an outer source IP address 1026, an outer destination IP address 1028, a User Datagram Protocol (UDP) header 1030, a GENEVE header 1040, a data field 1032, and a frame check sequence (FCS) 1034.

Original packet 1001 includes a network header 1002, an EtherType 1004, an IP header 1006, a UDP header 1008, data 1010, and a FCS 1012.

Security information 1041 includes a security tag 1042 and other information. The security tag 1042 includes a 32-bit security group identifier 1044 and a 64-bit (or 2×32-bit) security group membership vector 1046. The security information 1041 also includes a protocol type 1050, a verification 1052, an opt len field 1054, an O field 1056, a C field 1058, an RSVD field 1060, a reserved field 1062, a virtual network identifier 1064, a type 1068, a LEN=4 field, and an options class 1072.

Figure 11:
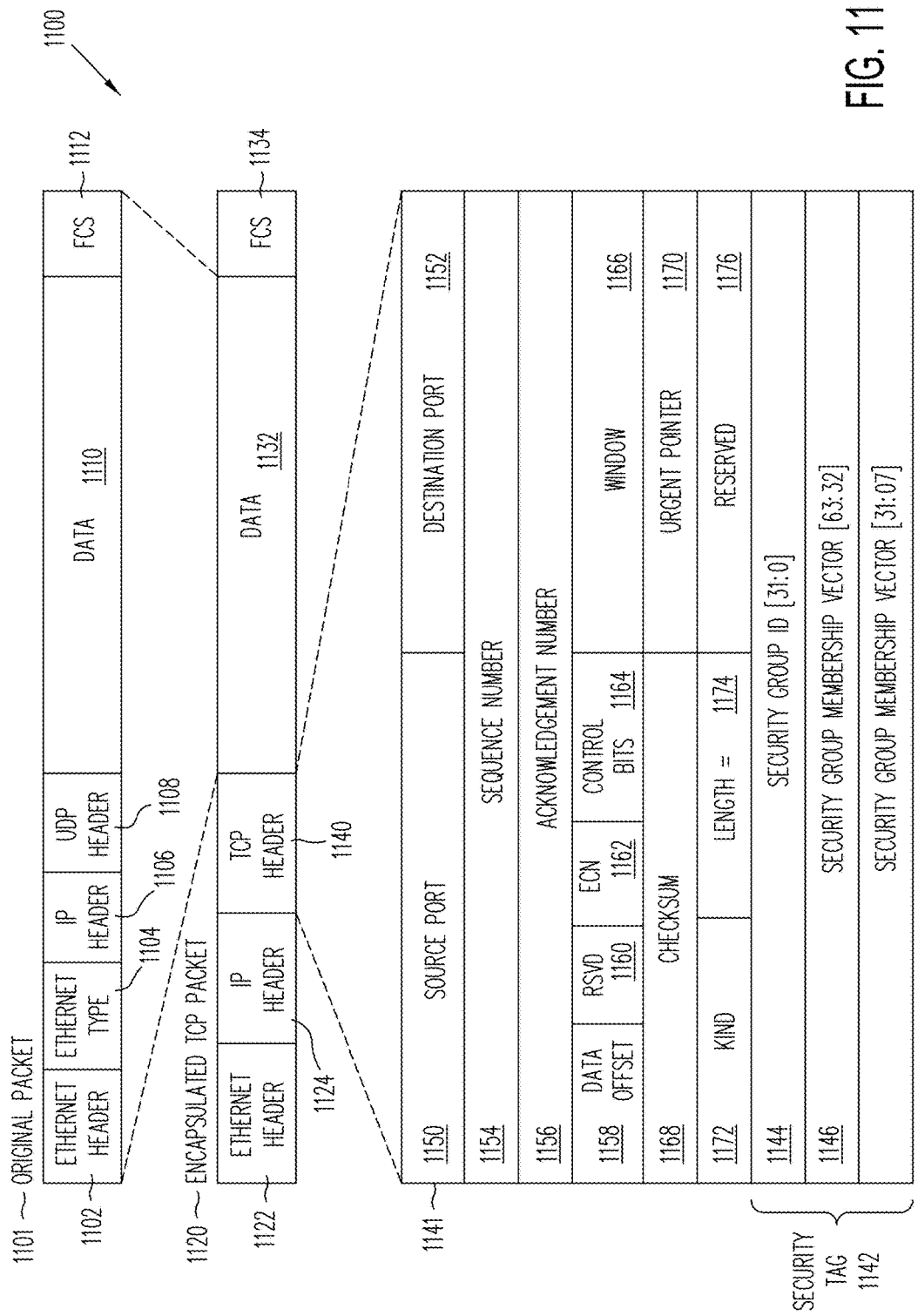
FIG. 11 is a conceptual diagram of an example encapsulation of a network packet by using a new TCP option type.

FIG. 11 is a conceptual diagram of an example encapsulation 1100 of a network packet by using a new TCP option type. The encapsulating may be carried out by enforcement component (EC) 500 of FIG. 5.

EC 500 encapsulates the TCP packet 1120 with an original packet 1101 into a data field 1132. EC 500 encapsulates TCP packet 1120 with security information 1141 into a TCP header 1140. The encapsulated TCP packet 1120 requires a new TCP options type defined. An Internet authority/committee should approve the new TCP options type before implementation.

In the example of FIG. 11, encapsulated TCP packet 1120 includes a network header 1122, an IP header 1124, a TCP header 1140, a data field 1132, and an FCS field 1134.

Original packet 1101 includes a network header 1102, an EtherType 1104, an IP header 1106, a UDP header 1108, data 1110, and a FCS 1112.

Security information 1141 includes a security tag 1142 and other information. The security tag 1142 includes a 32-bit security group identifier 1144 and a 64-bit (or 2×32-bit) security group membership vector 1146. The security information 1141 also includes a source port 1150, a destination port 1152, a sequence number 1154, an acknowledgement number 1156, a data offset 1158, an RSVD field 1160, an ECN field 1162, control bits 1164, a window 1166, a checksum 1168, an urgent pointer 1170, a kind 1172, a length1174, and a reserved 1176.

Figure 12:
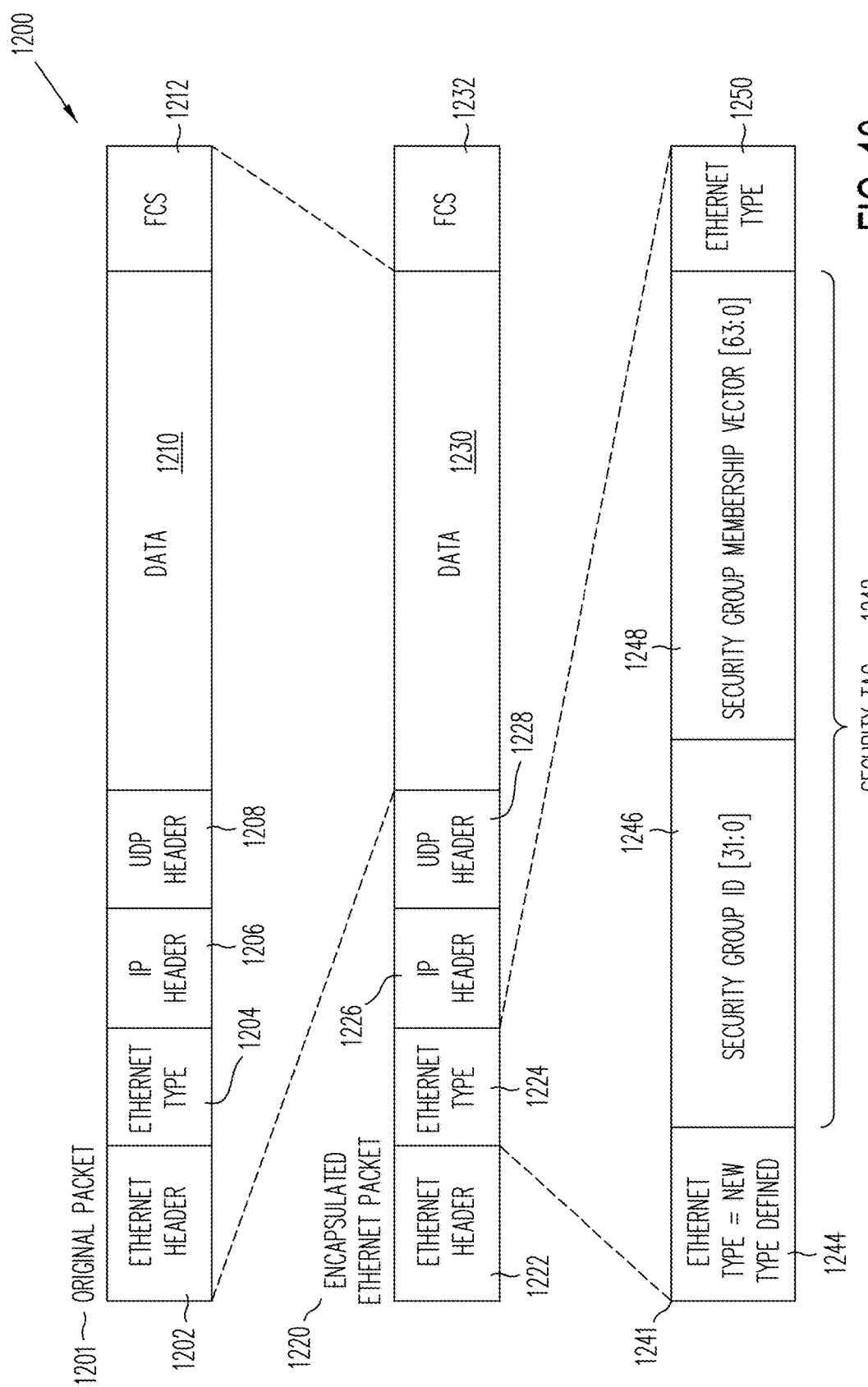
FIG. 12 is a conceptual diagram of an example encapsulation of a network packet by using a new EtherType.

FIG. 12 is a conceptual diagram of an example encapsulation 1200 of a network packet by using a new EtherType. The encapsulation 1200 may be carried out by enforcement component (EC) 500 of FIG. 5.

EC 500 encapsulates the network packet 1220 with an original packet 1201 into data field 1230. EC 500 encapsulates the network packet 1220 with security information 1241 into an EtherType 1224. The encapsulated network packet 1220 uses a newly defined EtherType. An Internet authority/committee usually approves new EtherTypes before implementation.

In the example of FIG. 12, encapsulated network packet 1220 includes a network header 1222, an EtherType 1124, a IP header 1226, a UDP header 1228, a data field 1230, and an FCS field 1232.

Original packet 1201 includes a network header 1202, an EtherType 1204, an IP header 1206, a UDP header 1208, data 1210, and a FCS 1212.

Security information 1241 includes a security tag 1242 and other information. The security tag 1242 includes a 32-bit security group identifier 1246 and a 64-bit security group membership vector 1248. The security information 1241 also includes a new EtherType defined 1244 and an EtherType 1250.

Examples of Virtual Network Services

Not only can security rules be enforced, the use of security tags in network packets and associating machines with one or more predefined security groups also allows a NIC to provide virtual network services to a server within a computer network. Virtual network services provided by the NIC may include, for example, secured web page access, secured credit card storage access, deep packet inspection, gathering statistics (e.g., throughput, round-trip time (RTT), number of packets sent, etc.), performing mirroring functionality by sending packet to two different networks, and so on.

Referring again to FIG. 4, the central management controller 420 and the management agents 433A-433N can set different levels of security for different security groups. For example, the system set a high level of security for secured web page access, and can set an even higher level of security for secured credit card storage access.

Computer Apparatus

Figure 13:
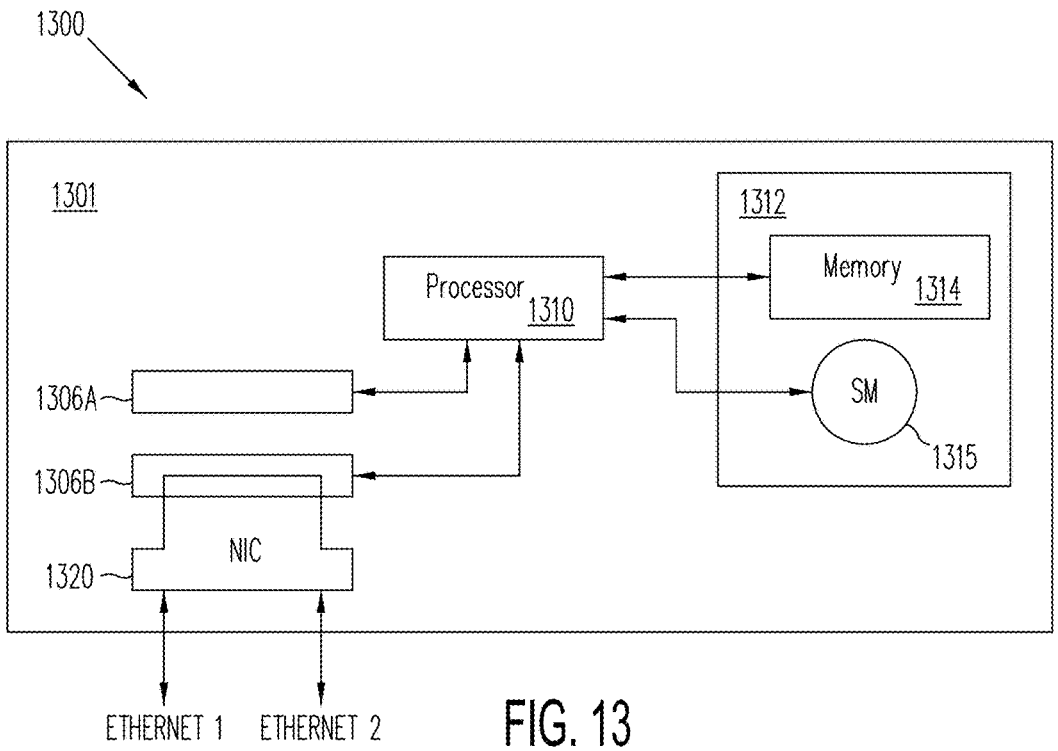
FIG. 13 illustrates a computer apparatus implementation of a server of FIG. 4 with a network interface card supporting the distributed security and virtual network services.

FIG. 13 illustrates a functional block diagram of a computer server 1300 that may be used as an instance of a server shown in FIG. 4. The computer server 1300 includes a processor 1310, one or more storage devices 1312, and one or more sockets 1306A-1306B mounted to a motherboard 1301. Wire traces of the motherboard printed circuit board couple the one or more storage devices 1312, and the one or more sockets 1306A-1306B to the processor 1310. The computer server 1300 further includes a network interface card (N IC) 1320 plugged into the socket 1306B of the motherboard so that it can communicate with the processor 1310. The processor 1310 can execute instructions, or code of software programs, to perform one or more processes to facilitate or perform elements of the methods described herein. Instructions or code of software programs that are to be executed by the processor 1310 may be stored in the storage device 1312.

The computer server 1300 further includes a network interface card (NIC) 1320 plugged into the socket 13068 of the motherboard so that it can communicate with the processor 1310. The network interface card (NIC) 1320 includes one or more communication ports (Ethernet 1, Ethernet 2) to bi-directionally communication with a computer network. The network interface card 1320 can perform one or more processes/operations to facilitate or perform elements of the methods described herein.

The one or more storage devices 1312 may include one or more of memory devices 1314, such as a volatile memory like RAM, SDRAM, DDR, DDR2, DDR3; and a storage media (SM) 1315. The storage media 1315 may comprise a non-volatile memory such as a solid-state drive, a hard drive, and the like. In some embodiments, as is known in the art, the storage media 1315 may be located on another computing device across a network (not shown). Instructions may be loaded from the storage media into the memory. Included in the storage device 1312 is a set of processor executable instructions that, when executed by the processor 1310 configure the computing apparatus to perform actions consistent with the methods disclosed herein. The processor may retrieve instructions from the storage media or memory and execute the instructions to perform one or more processes/operations to facilitate or perform elements of the methods described herein.

Figure 14:
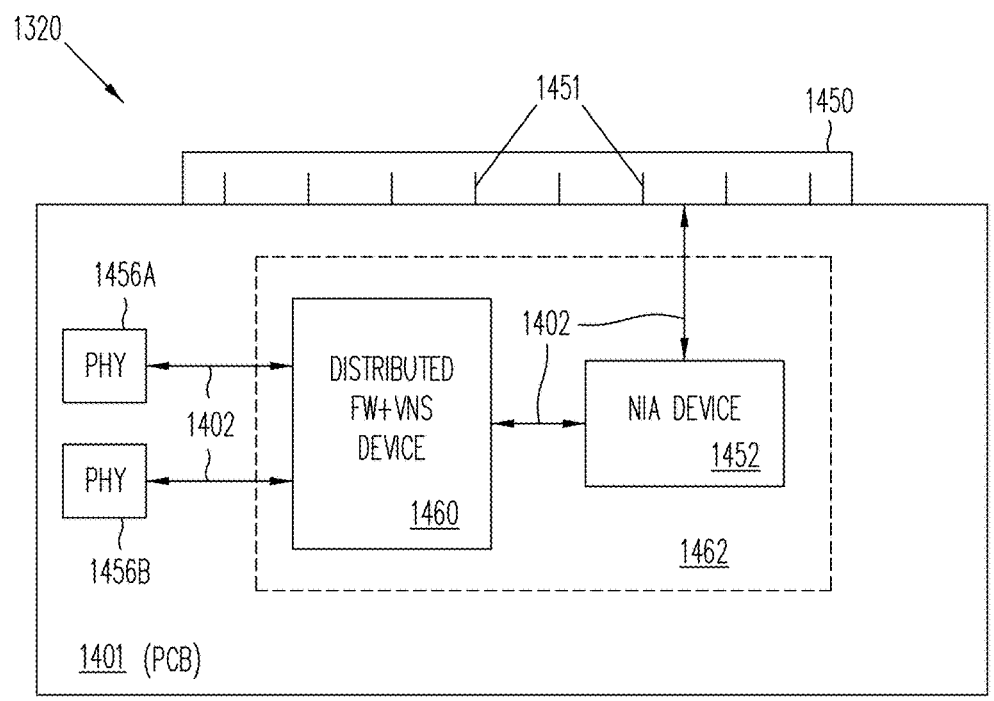
FIG. 14 illustrates a functional block diagram of the network interface card (NIC) installed in the server of FIG. 13.

Referring now to FIG. 14, the network interface card (NIC) 1320 includes a printed circuit board 1401 with a plurality of wire traces 1402 and an edge connector 1450 with a plurality of pads 1451. The network interface card (NIC) 1320 further includes a distributed firewall (FW) and virtual network services (VNS) device 1460, a network interface adapter device 1452, and physical network connection devices 1456A-1456B mounted to the printed circuit board 1401 and coupled to its wire traces 1402. The physical network connection devices 1456A-1456B provide the communication ports (Ethernet 1, Ethernet 2) to bi-directionally communication with a computer network.

The network interface adapter device 1452 is coupled to the edge connector 1450 and its pads 1451 by one or more traces 1402. The edge connector 1450 plugs into one of the sockets 1306A-1306B of the computer server 1301, such as shown in FIG. 13. In this manner, the network interface device 1452 is coupled to the processor 1310 on the motherboard PCB 1301 of the server shown in FIG. 13.

The distributed firewall (FW) and virtual network services (VNS) device 1460 is coupled to and between the physical network connection devices 1456A-1456B and the network interface adapter device 1452 by one or more traces 1402 of the PCB 1401. In an alternate embodiment, the distributed firewall (FW) and virtual network services (VNS) device 1460 and the network interface adapter device 1452 are integrated together such that the wire traces 1402 between each are also integrated as part of one network interface adapter device 1462.

As mentioned previously, the network interface card 1320 can perform one or more processes/operations to facilitate or perform elements of the methods described herein. The distributed firewall (FW) and virtual network services (VNS) device 1460 is in each router and server of a network in accordance with an embodiment. The distributed firewall (FW) and virtual network services (VNS) device 1460 includes logical circuits and memory to perform elements of the methods described herein. The distributed firewall (FW) and virtual network services (VNS) device 1460 in each router and server is coupled in communication with the central management controller 420 and its management database 425 to perform the elements of the methods disclosed herein.

CONCLUSION

Advantageously, the present technology simplifies the definition, management and implementation of security rules and network services rules. The system provides an efficient way of defining security groups for network packets in a trusted network. The system provides a very simple way of encapsulating and transporting the security tags over the network. The system provides a platform for efficiently transporting the tags, an effective way of providing the security and network services with minimal hardware and software resources, and a simple way of managing the security rules and network services rules across all firewalls. The system allows for providing network services on a packet-by-packet basis, rather than every service for every packet. Thus, the system improves efficiency and reduces the amount of expensive hardware needed.

When implemented in software, the elements of the embodiments of the invention are essentially the program, code segments, or instructions to perform the necessary tasks. The program, code segments, or instructions can be stored in a processor readable medium or storage device that can be read and executed by a processor. The processor readable medium may include any medium that can store information. Examples of the processor readable medium include an electronic circuit, a semiconductor memory device, a read only memory (ROM), a flash memory, an erasable programmable read only memory (EPROM), a floppy diskette, a CD-ROM, an optical disk, and a magnetic disk. The program or code segments may be downloaded via computer networks such as the Internet, Intranet, etc. and stored in the processor readable medium or storage device.

Some portions of the preceding detailed description may have been presented in terms of algorithms and symbolic representations that perform operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities may take the form of electrical (e.g., current or voltage) or magnetic signals capable of being stored, transferred, combined, compared, and otherwise manipulated. It has proven convenient at times, principally for reasons of common usage, to refer to these signals as bits, values, levels, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, processing logic, or similar electronic computing device, that automatically or semi-automatically manipulates and transforms data represented as physical (electronic) quantities within the computer system's registers and memories into other data similarly represented as physical quantities within the computer system memories or registers or other such information storage, transmission or display devices.

Additionally, the embodiments of the invention are not described with reference to any particular programming language. It will be appreciated that a variety of programming languages may be used to implement the teachings of the embodiments of the invention as described herein.

It will be appreciated that the embodiments of the invention can be practiced by other means than that of the above-described embodiments, which are presented in this description for purposes of illustration and not of limitation. The specification and drawings are not intended to limit the exclusionary scope of this patent document. It is noted that various equivalents for the particular embodiments discussed in this description may be practice by the claimed invention as well. That is, while specific embodiments of the invention have been described, it is evident that many alternatives, modifications, permutations and variations will become apparent in light of the foregoing description. Accordingly, it is intended that the claimed invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method for a distributed firewall and virtual network services on a network, the method comprising:
   storing a plurality of predefined security groups to be associated with one or more virtual machines, without using a user based access control list, wherein each predefined security group has a set of predefined security rules for network packets configured to be transmitted between virtual machines (VMs) within the network;
   assigning each virtual machine (VM) within the network to one or more of the plurality of predefined security groups (SGs);
   at a network interface controller of a server hosting a sending VM, filtering an outgoing network packet being sent by the sending VM in response to the predefined security rules associated with the one or more of the plurality of predefined SGs assigned to the sending VM to validate the communication desired in the outgoing network packet;
   at the network interface controller, forming a secured network packet by encapsulating a header, a security tag, and the outgoing network packet together, wherein the security tag indicates one or more security groups with authorized access to transmit and to receive the outgoing network packet; and
   at the network interface controller, transmitting the secured network packet into the network for delivery to a receiving VM.

2. The method of claim 1, further comprising:
   receiving, at a server hosting the receiving VM, the secured network packet including the security tag;
   filtering the secured network packet from the sending VM in response to the predefined security rules associated with the one or more predefined SGs associated with the receiving VM;
   decapsulating the secured network packet by removing the header and the security tag from the secured network packet; and
   providing the incoming network packet to the receiving VM.

3. The method of claim 1, further comprising:
   receiving a secured incoming network packet including an incoming security tag;
   filtering the secured incoming network packet in response to the predefined security rules associated with the one or more predefined SGs;
   decapsulating the secured incoming network packet by removing an incoming header and the incoming security tag from the secured incoming network packet; and
   providing the incoming network packet.

4. The method of claim 1, wherein
   the security tag includes a plurality of bits of a security group membership vector, each bit of the security group membership vector indicating a subscription to a security group of the one or more security groups with the authorized access to transmit and receive the network packet.

5. The method of claim 4, wherein
   the security tag further includes a security domain identification that uniquely identifies a plurality of virtual machines, including the sending VM and the receiving VM, with authorized access to the outgoing network packet.

6. The method of claim 1, wherein the secured network packet includes one of:
   a new GENEVE network encapsulation protocol packet;
   a new Transmission Control Protocol (TCP) packet with a new TCP option type being defined;
   or
   a new network packet with a new EtherType being defined.

7. The method of claim 1, wherein the network includes a local area network (LAN) that is separated from a wide area network (WAN) by a gateway router that is loaded with the plurality of predefined security groups, wherein the gateway router is configured to implement the set of predefined security rules on network packets received at the gateway router.

8. The method of claim 7, wherein the receiving VM is located on an external server in a wide area network (WAN), and wherein the transmitting further comprises:
   sending the secured network packet to the receiving VM on the external server, wherein the secured network packet is configured to be decapsulated by the gateway router before the gateway router passes the outgoing network packet to the receiving VM on the external server.

9. The method of claim 1, further comprising:
   before storing the plurality of predefined security groups, receiving the plurality of predefined security groups from a central management controller configured to send updates of the predefined security groups to management agents on servers that host the virtual machines; and
   loading the plurality of predefined security groups onto one of the management agents.

10. The method of claim 1, further comprising:
   assigning a network service to the security tag in response to the one or more security groups (SGs) associated with the sending virtual machine (VM), wherein the network service includes at least one of:
   secured web access;
   secured credit card storage access;
   deep packet inspection;
   gathering statistics; or
   performing mirroring functionality.

11. An apparatus comprising:
   a printed circuit board (PCB) including a plurality of wire traces and an edge connector;
   a processor mounted to the PCB and coupled in communication with the edge connector by one or more of the plurality of wire traces;
   a storage device mounted to the PCB and coupled in communication with the processor by one or more of the plurality of wire traces, the storage device storing instructions for execution by the processor including instructions that cause the processor to perform
      filtering an outgoing network packet being sent by a sending virtual machine (VM) in response to predefined security rules associated with predefined security groups assigned to the sending VM in order to validate the communication desired in the outgoing network packet, wherein the predefined security groups are associated with one or more virtual machines without use of a user based access control list;
      forming a secured network packet by encapsulating a header, a security tag, and the outgoing network packet together, wherein the security tag indicates one or more security groups (SGs) with authorized access to transmit and to receive the outgoing network packet; and
      transmitting the secured network packet into the network for delivery to a receiving VM.

12. The apparatus of claim 11, wherein the instructions further cause the processor to perform:
   receiving a secured incoming network packet including an incoming security tag;
   filtering the secured incoming network packet in response to the predefined security rules associated with the one or more predefined SGs;
   decapsulating the secured incoming network packet by removing an incoming header and the incoming security tag from the secured incoming network packet; and
   providing the incoming network packet to a virtual machine.

13. The apparatus of claim 11, wherein
   the security tag includes a plurality of bits of a security group membership vector, each bit of the security group membership vector indicating a subscription to a security group of the one or more security groups with authorized access to transmit and receive the network packet.

14. The apparatus of claim 13, wherein
   the security tag further includes a security domain identification that uniquely identifies a plurality of virtual machines, including the sending VM and the receiving VM, with authorized access to the outgoing network packet.

15. The apparatus of claim 11, wherein the secured network packet includes one of:
   a new GENEVE network encapsulation protocol packet;
   a new Transmission Control Protocol (TCP) packet with a new TCP option type being defined; or
   a new network packet with a new EtherType being defined.

16. The apparatus of claim 11, wherein the network includes a local area network (LAN) that is separated from a wide area network (WAN) by a gateway router that is loaded with the plurality of predefined security groups, wherein the gateway router is configured to implement the set of predefined security rules on network packets received at the gateway router.

17. The apparatus of claim 16, wherein the receiving VM is located on an external server in a wide area network (WAN), and wherein the transmitting further comprises:
   sending the secured network packet to the receiving VM on the external server, wherein the secured network packet is configured to be decapsulated by the gateway router before the gateway router passes the outgoing network packet to the receiving VM on the external server.

18. The apparatus of claim 11, wherein the instructions further cause the processor to perform:
   before storing the plurality of predefined security groups, receiving the plurality of predefined security groups from a central management controller configured to send updates of the predefined security groups to management agents on servers that host the virtual machines; and
   loading the plurality of predefined security groups onto one of the management agents.

19. A method for routing network packets between a local area network (LAN) and a wide area network (WAN), the method comprising:
   at a router, receiving a secured network packet, including a security tag, from a sending virtual machine (VM) on a local area network, wherein the security tag indicates one or more security groups with authorized access to transmit and to receive an outgoing network packet;
   at the router, filtering the secured network packet from the sending VM in response to predefined security rules associated with one or more predefined security groups (SGs) assigned to the sending VM, without using a user based access control list;
   at the router, decapsulating the secured network packet by removing the header and the security tag from the secured network packet to generate the outgoing network packet; and sending the outgoing network packet to a server on a wide area network (WAN) based on the outgoing network packet.

20. The method of claim 19, wherein
the security tag includes a plurality of bits of a security group membership vector, each bit of the security group membership vector indicating a sender's subscription to a security group of the one or more security groups with authorized access to transmit and receive the secured network packet.

21. The method of claim 20, wherein
the security tag further includes a security domain identification that uniquely identifies one or more virtual machines, including the sending VM, with authorized access to the outgoing network packet.

22. The method of claim 19, wherein the secured network packet includes one of:
a new GENEVE network encapsulation protocol packet;
a new Transmission Control Protocol (TCP) packet with a new TCP option type defined; or
a new network packet with a new EtherType being defined.

23. The method of claim 19, further comprising:
assigning a network service to the security tag in response to the one or more security groups (SGs) assigned to the sending virtual machine (VM).

* * * * *